(12) United States Patent
Hurtis et al.

(10) Patent No.: US 7,702,656 B2
(45) Date of Patent: Apr. 20, 2010

(54) METHOD, SYSTEM, AND STORAGE MEDIUM FOR PROVIDING A DYNAMIC, MULTI-DIMENSIONAL COMMODITY MODELING PROCESS

(75) Inventors: George M. Hurtis, Rochester, MN (US); Ivory W. Knipfer, Rochester, MN (US); Jeffrey G. Komatsu, Kasson, MN (US); Manivannan Thavasi, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 312 days.

(21) Appl. No.: 11/840,531

(22) Filed: Aug. 17, 2007

(65) Prior Publication Data

US 2007/0282913 A1 Dec. 6, 2007

Related U.S. Application Data

(62) Division of application No. 10/652,017, filed on Aug. 29, 2003, now Pat. No. 7,302,445.

(51) Int. Cl.
*G06F 17/00* (2006.01)
(52) U.S. Cl. ............... 707/104.1; 707/101; 707/102; 707/103 R
(58) Field of Classification Search ........... 707/1–10, 707/100–104.1, 200–206
See application file for complete search history.

(56) References Cited

U.S. PATENT DOCUMENTS

| 6,338,053 | B2 | 1/2002 | Uehara et al. |
| 6,366,922 | B1 | 4/2002 | Althoff |

*Primary Examiner*—Isaac M Woo
(74) *Attorney, Agent, or Firm*—Cantor Colburn LLP; Derek Jennings (57) ABSTRACT

An exemplary embodiment of the invention relates to a method, system, and storage medium for providing a dynamic multi-dimensional commodity modeling process. The system includes a data collection component operable for collecting raw data, a dynamic multi-dimensional commodity model component, and a commodity tree generated by the dynamic multi-dimensional commodity model component. The system also includes a closed loop/corrective action component operable for resolving nonconformance issues resulting from analysis of the raw data and commodity tree, and an analytic engine in communication with the data collection component, the multi-dimensional commodity model component, and the closed loop/corrective action component. The analytic engine receives the raw data from the data collection component, receives the commodity tree, performs analytics on the raw data according to rules defined by the commodity tree, and transmits any nonconformance data resulting from performing the analytics to the closed loop/correction action component for resolution of any identified nonconformances.

1 Claim, 6 Drawing Sheets

METHOD, SYSTEM, AND STORAGE MEDIUM FOR PROVIDING A DYNAMIC, MULTI-DIMENSIONAL COMMODITY MODELING PROCESS

CROSS REFERENCE TO RELATED APPLICATION

This application is a divisional application of U.S. Ser. No. 10/652,017, filed Aug. 29, 2003, the contents of which are incorporated by reference herein in their entirety.

BACKGROUND

The present invention relates generally to quality management systems, and more particularly, the invention relates to a method, system, and storage medium for providing a dynamic multi-dimensional commodity modeling process for implementation via a quality management system.

Manufacturing operations typically involve some degree of monitoring production quality performance and provide quality control capability by monitoring and analyzing quality data. While various software applications exist for facilitating these activities, they are generally limited to a fixed set of programs that analyze and monitor quality data across static product characteristics. For example, in a hardware manufacturing environment, such technology may provide the capability of monitoring power supplies, specific suppliers, a unique part number, etc. Any desire to change the analytics or product dimensions to be monitored results in the need for extensive hard-code changes to the computing application or query. Attempts to rewrite software queries that will measure atypical characteristics take time, such as a few hours to several days. Thus, the ability to change performance monitoring and control actions across multiple part dimensions or characteristics in near real-time is not feasible.

This problem becomes significant in large manufacturing operations where thousands, or tens of thousands, of component parts are utilized for production, especially when many of these parts have common characteristics (e.g., same supplier, same function, same size, etc.). In these operations, there exists a near daily need to analyze quality data in a variety of ways to understand part performance issues. The dynamic need to change analytics across multiple dimensions presents significant problems with existing processes and technology. This problem is most evident in manufacturing operations where complex products are produced in a "build-to-order" environment with a high degree of featurability. As operations move from mass production of like products to customized assemblies with a lot size of one, simple analytics such as failure rates are ineffective in characterizing performance.

What is needed, therefore, is a way to provide flexible, commodity data modeling that allows for analysis criteria to be alterable in a near real-time environment.

SUMMARY

An exemplary embodiment of the invention relates to a method, system, and storage medium for providing a dynamic multi-dimensional commodity modeling process. The system includes a data collection component operable for collecting raw data, a dynamic multi-dimensional commodity model component, and a commodity tree generated by the dynamic multi-dimensional commodity model component. The system also includes a closed loop/corrective action component operable for resolving nonconformance issues resulting from analysis of the raw data and commodity tree, and an analytic engine in communication with the data collection component, the multi-dimensional commodity model component, and the closed loop/corrective action component. The analytic engine receives the raw data from the data collection component, receives the commodity tree, performs analytics on the raw data according to rules defined by the commodity tree, and transmits any nonconformance data resulting from performing the analytics to the closed loop/correction action component for resolution of any identified nonconformances.

BRIEF DESCRIPTION OF THE DRAWINGS

Referring now to the drawings wherein like elements are numbered alike in the several FIGURES.

DETAILED DESCRIPTION

Embodiments of the invention include a multi-dimensional commodity model process, which as implemented, facilitates an on-demand quality monitoring and control process that is tailorable to meet the needs of any quality management system as well as for use in any industry. By developing a unique data modeling approach, this process provides the capability to automatically monitor performance on an unlimited number of elements, across any number of dimensions, utilizing multiple analytic algorithms without changes in program hard-coding. This modeling approach also provides the ability to change the time history of the data being analyzed, providing additional flexibility in performance monitoring across the dimension of time. Integration of this data modeling approach into an existing quality management system produces a dynamic ability to facilitate real-time quality performance monitoring and control. While embodiments of the invention are described herein with respect to an electronics manufacturing industry, it will be understood that the multi-dimensional commodity model may be applied to any industry that performs quality management functions. Thus, the examples provided with respect to the electronics industry are intended for purposes of illustration and are not to be construed as limiting in scope.

The following definitions are supplied in reference to the components of the multi-dimensional commodity model.

Commodity. As used herein, a commodity refers to a high-level (e.g., top level) grouping of elements that are arranged according to relationship factors. For example, in the electronics industry, commodities might include power supplies, mechanical parts, cables, electronics and decorative covers.

Sub-commodity. A sub-commodity refers to a more granular grouping of a commodity used to detail the sub-elements of a commodity. A sub-commodity can have multiple sub-commodities identified within it (i.e., nested sub-commodities) to define things such as classification, reliability, physical characteristics, naming convention, supplier or marketing preferences or any other suitable attributes. An example of sub-commodities for an electronics commodity might be memory, processors, and input/output devices.

Constituent. A constituent refers to the detailed component or basic foundational unit or element of a commodity from which measurements are performed. For example, under the sub-commodity processors, a specific constituent might be a part number '99X9999'.

Node. A node refers to any level of grouping of commodities, sub-commodities, or constituents in a commodity tree for the purpose of performing an analysis.

A commodity tree refers to a hierarchical data structure for a commodity including associated sub-commodities and constituents and is created by the multi-dimensional commodity model process. Commodity trees comprise a top level node (s), optional secondary level nodes (e.g., sub-commodities and nested subcommodities), and leaf level nodes (e.g., constituent nodes). The nodes of the commodity tree are assigned uniform attributes and dimensional attributes. These attributes are then inherited down the commodity tree to all applicable dependent nodes.

Commodity constituent model Level 1 (CCM L1). A set of attributes that defines the uniform characteristics of interest associated with nodes for a particular commodity and for which analytics are to be performed.

Commodity constituent model Level 2 (CCM L2). A set of attributes that defines the dimensions to analyze, along with the associated trends and patterns of interest, for any particular node in any commodity tree.

Figure 1:
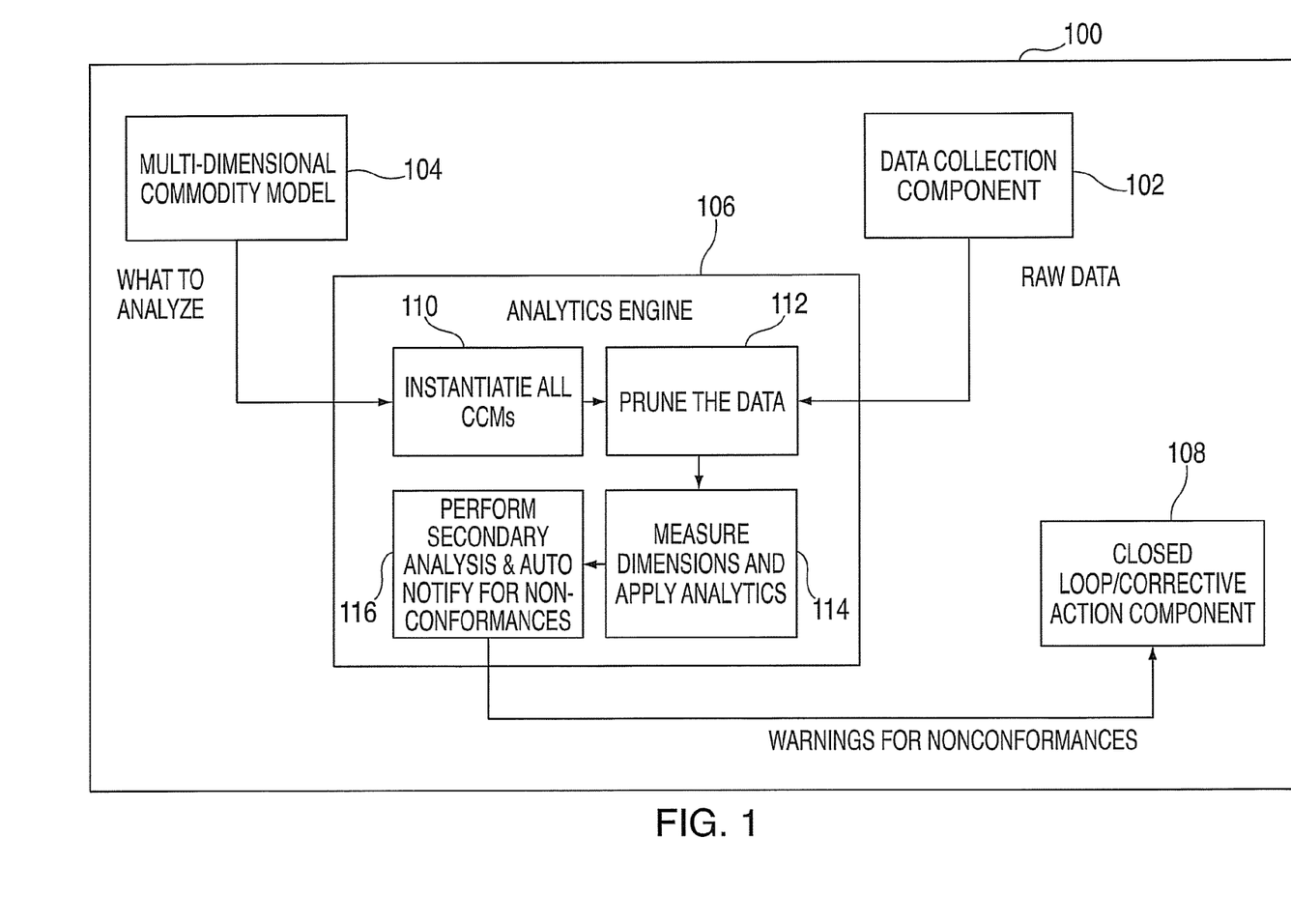
FIG. 1 is a block diagram illustrating a quality management system upon which the multi-dimensional commodity modeling process is implemented in an exemplary embodiment.

FIG. 1 is a block diagram describing the multi-dimensional commodity model in the context of a quality management system (QMS) environment. It will be understood by those skilled in the art, however, that the multi-dimensional commodity model may be implemented in any environment that desires to analyze large amounts of data in a variety of ways; thus, the on-demand QMS 100 of FIG. 1 is described herein for illustration and is not intended to be limiting in scope. The QMS 100 may comprise a commercial quality management application or may be IBM's Product Quality Management System™. Further, while the invention is described with respect to a specific manufacturing industry, i.e., electronics, it will be understood that the modeling features of the multi-dimensional commodity model may be applied to any industry that may benefit from utilizing a quality management system. The four components of QMS 100 comprise: data collection 102, multi-dimensional commodity model 104, analytic engine 106, and closed loop/corrective action 108.

Data collection component 102 provides performance and parametric data to analytic engine 106 by collecting all relevant data spanning a range of activities from the procurement of raw materials to customer installation and return of products and components. The process performed by data collection component 102 is highly dependent on the product characteristics from commodity to commodity. For example, in an electronics manufacturing environment, high-cost storage subsystems may require more detail and component information than a label that is valued under a dollar. Additionally the performance data for a supplier sourced assembly may include the details of the assembly or could be a 'pass/fail' of the assembly itself.

Multi-dimensional commodity model component 104 provides an efficient method to dynamically select what data (e.g., commodities, sub-commodities, constituents) to analyze, how to analyze it, and what patterns and trends to look for. These models are created by multi-dimensional commodity model component 104 and act as a virtual set of controls that allow QMS analytics to be modeled in multiple ways. The inheritance properties of these models, along with their two-level design, provide virtually unlimited capability to analyze a variety of attributes and dimensions, to change these attributes and dimensions at will, while maintaining uniform characteristics for each commodity. The reliance on hard-coded queries and applications known in the art and existing in current solutions can be eliminated. The process performed by the multi-dimensional commodity model 104 results in a set of commodity constituent models and is described further herein.

Analytic engine 106 applies the commodity constituent models created by multi-dimensional commodity model 104. It also prunes the data as defined by the commodity constituent models and applies analytics to the pruned data as defined by the commodity constituent models. Analytic engine 106 also runs secondary analysis on the analytic output to identify nonconforming trends and patterns as defined by the commodity constituent models and automatically notifies all nonconforming trends to the closed loop/corrective action process 108.

The process 110 of analytic engine 106 represents an instantiation of a set of commodity constituent models from 104. Process 112 utilizes the commodity constituent model attributes instantiated in process 110 to prune the data from data collection component 102. The output of process 112 is the pruned data of constituents identified by the commodity constituent models having attributes and dimensions that meet the criteria provided in the model. The output of process 112 is used by process 114. Process 114 performs the analysis defined by the commodity constituent models on the pruned data. The output of process 114 is a set of analytics for the dimensions specified in the commodity constituent models. Process 116 takes the analytics output by process 114 and performs a secondary analysis that looks for patterns and trends, which are also defined by the commodity constituent model, identifying those constituents that match the patterns and trends (referred to as nonconformances). Process 116 then automatically generates a message or alert to the closed/loop corrective action component 108 identifying the nonconformances so that action can be taken to alleviate future nonconformances.

Closed loop/corrective action process 108 drives problems, issues, or nonconformance items to closure. While the multi-dimensional commodity model component 104 defines the dimensions to be analyzed and the trends and patterns to search for, the process described in closed loop/corrective action component 108 is the "action end" of the system whereby identified nonconformances are assigned to owners and a pragmatic, closed-loop process is employed to ensure the appropriate corrective actions have been taken for each nonconformance.

Figure 2:
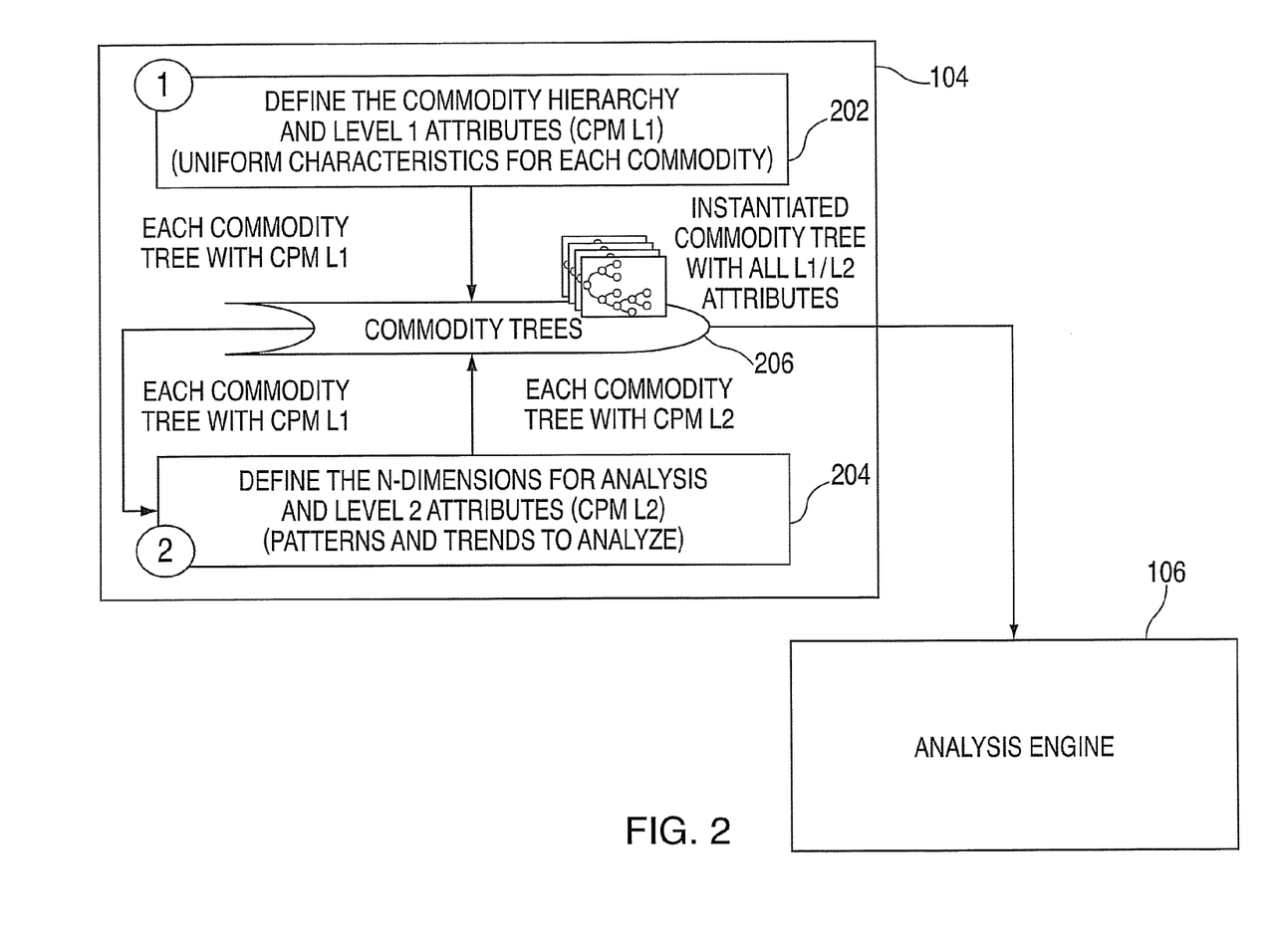
FIG. 2 is a diagram of the features of the multi-dimensional commodity model component of a quality management system in an exemplary embodiment.

Multi-dimensional commodity model 104 comprises a commodity hierarchy data structure and level 1 attributes referred to as commodity constituent model level 1 (CCM L1) 202 as shown in FIG. 2. As described above, CCM L1 202 refers to a set of attributes that defines the uniform characteristics of interest associated with a particular commodity for all analytics to be performed. Multi-dimensional commodity model 104 also comprises a number of dimensions and level 2 dimensional attributes referred to as commodity constituent model level 2 (CCM L2) 204. As described above CCM L2 204 refers to a set of attributes, that defines the dimensions to analyze, along with the associated trends and patterns of interest, for any particular element in any particular commodity model. These attributes and dimensions are dynamically alterable via the multi-dimensional commodity model component 104 during instantiation of the analytic process. Commodity tree 206 combines the elements provided in CCM L1 202 and CCM L2 204. A sample commodity tree is shown in greater detail in FIG. 6. Once created, commodity tree 206 is ready to be processed by analytic engine 106 as described above in FIG. 1.

Figure 3:
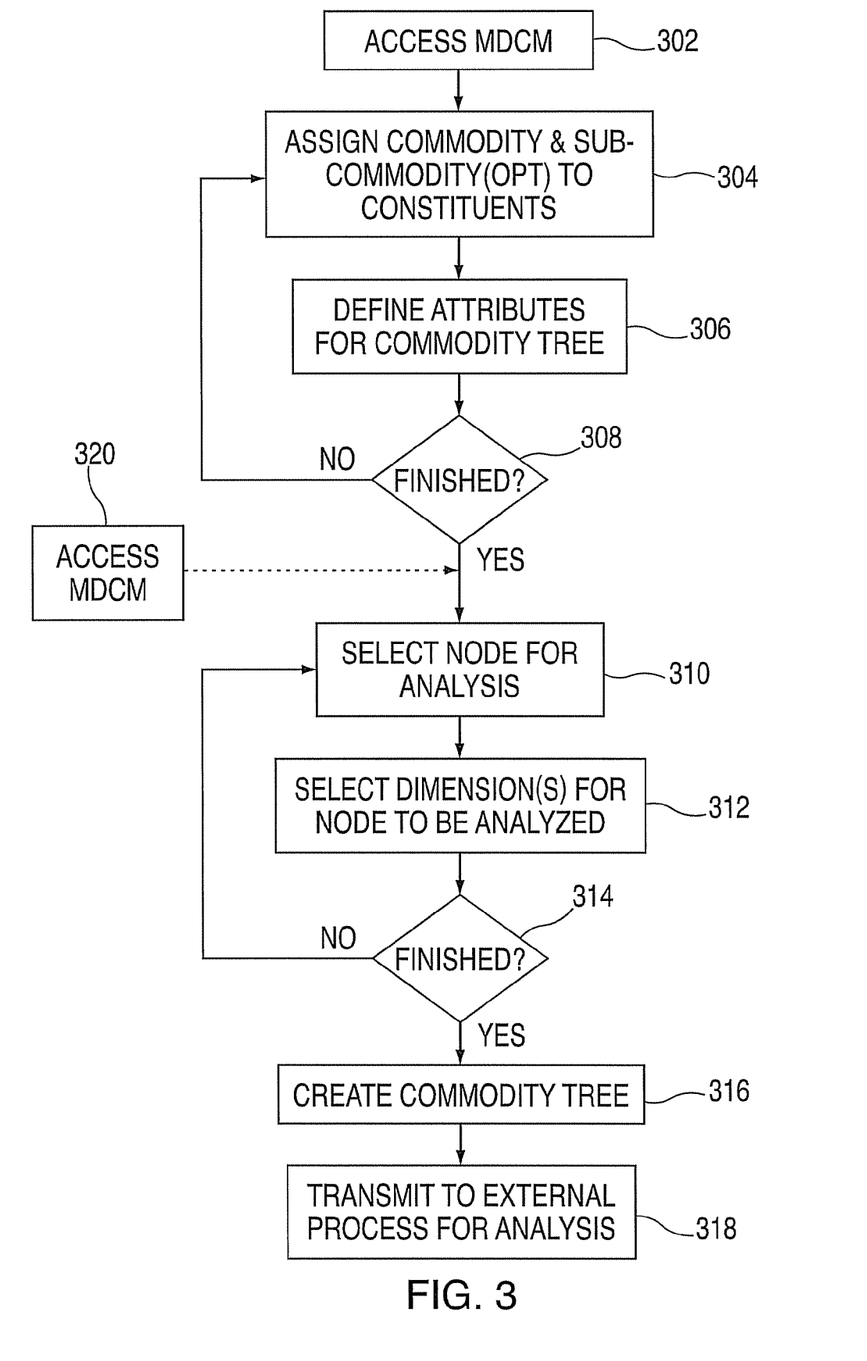
FIG. 3 is a flowchart describing a two-phase process of the multi-dimensional commodity model component for building a commodity tree structure in an exemplary embodiment.

A commodity tree is created by the multi-dimensional commodity model 104 utilizing a two-phase process as described in FIG. 3. The first phase of the process is to establish the base commodity hierarchy which defines the relationships between commodities, sub-commodities (as well as nested sub-commodities, if desired), and the constituents that are assigned to those sub-commodities. This process builds a set of tree data structures for assigning the CCM L1 attributes and CCM L2 dimensional attributes. An individual accesses the multi-dimensional commodity model 104 of QMS 100 at step 302. Initial assignment of commodities and sub-commodities to constituents is performed at step 304. All attributes that provide uniform characteristics during the CCM L1 phase to each commodity tree are established at step 306. Attributes can be user-defined according to the type of quality management system used and the nature of the industry utilizing the multi-dimensional commodity model 104. The attributes defined for a manufacturing industry may include sampling criteria, period definition, history definition, type of measure/analytic or any other attribute desired. At step 308, it is determined whether additional attributes are to be defined. If there are additional attributes to be defined, the process reverts back to step 304. If, on the other hand, all the attributes have been assigned, the second phase begins.

The second phase establishes dimensions for analyzing each commodity. At step 310, the commodity tree created by steps 302-308 is examined to determine which nodes or level in the commodity tree are to be analyzed. At step 312, it is determined what patterns or trends at the nodes/level within the tree are to be analyzed. These trends or patterns may include elements such as performance tolerances, noise filters, oscillation thresholds or trends, consecutive trending, and negative performance threshold. At step 314, it is determined whether there are additional nodes or levels to be analyzed. If there are additional nodes or levels to be analyzed, the process reverts to step 310. Once all of the attributes have been established for each commodity, the resulting commodity tree is created at step 316 and may be immediately utilized by analytic engine 106 to search, analyze and indicate the results of the intended mapping at step 318. The model is instantiated for each execution of analytic engine 106, and thus the controls and dials of the commodity constituent model can be changed virtually in real-time, anytime, and subsequent cycles will run with each new model instantiation.

In an alternative embodiment, a user may access the multi-dimensional commodity model 104 at step 320 and bypass the CCM L1 phase definitions if desired. This may be desirable where attributes for CCM L1 have already been established and it is not necessary to access these features.

Figure 4:
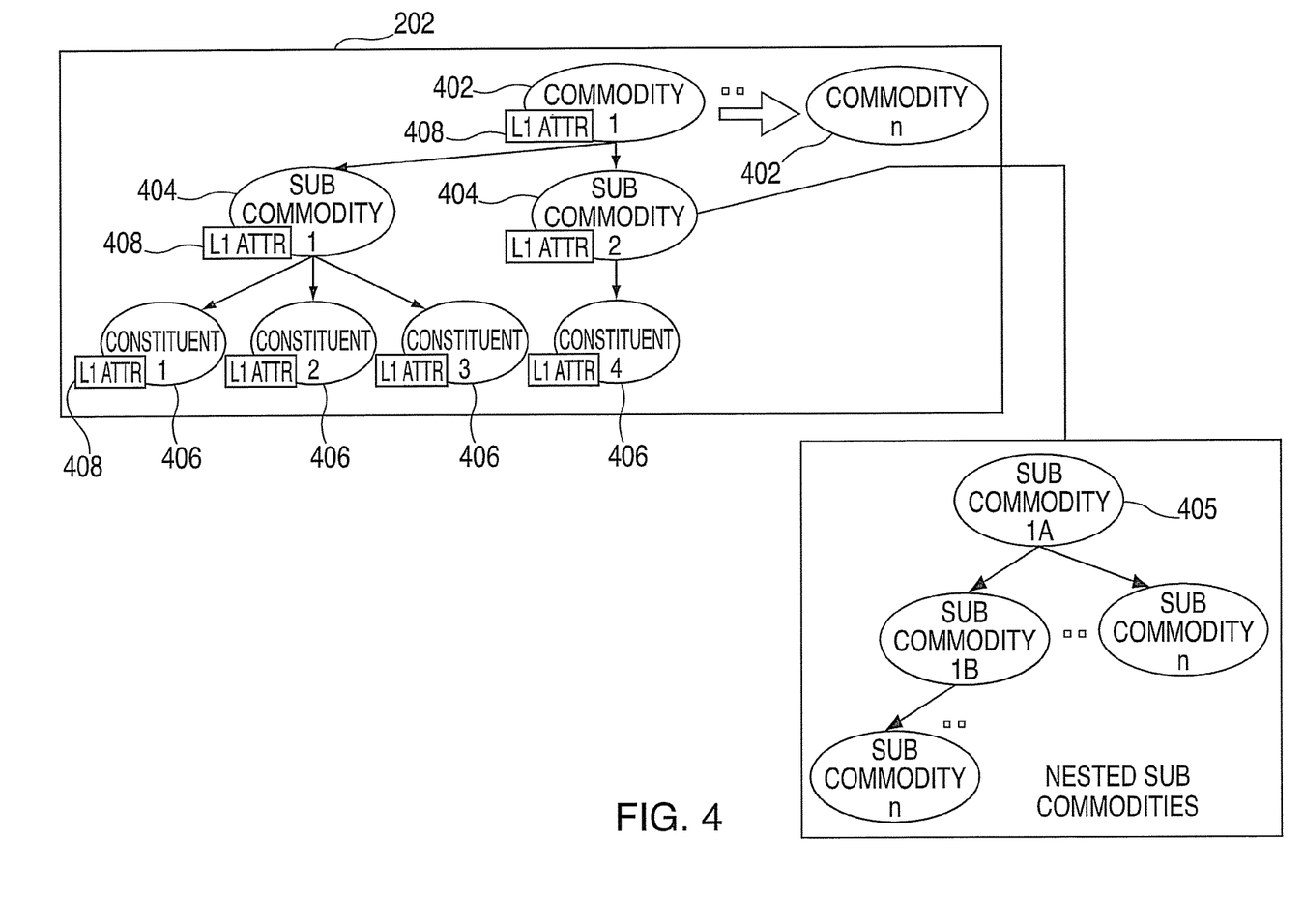
FIG. 4 is a diagram of a level 1 commodity constituent model that is associated with the CCM level 1 phase in an exemplary embodiment.

FIG. 4 illustrates a level 1 commodity constituent model 202 produced by the multi-dimensional commodity model 104. The modeling of the commodity hierarchy and CCM L1 attributes build the base commodity hierarchy for each commodity and provides uniform characteristics to each commodity tree. This tree can be created, changed, and updated in real time and is the base infrastructure for all analysis for the analytic engine. The attributes assigned during this phase are only used when CCM L2 selection is made on a particular node in the tree.

It is important to note that all analytics are derived from the detailed constituents where the actual performance occurs. This process builds a set of data structures that represents several n-level tertiary trees where the top node in each tree represents the overall commodity 402 and the leaf nodes (also referred to as constituents) 406 end up as the detailed constituents to be analyzed as demonstrated in FIG. 4.

Commodity 402 may have sub-commodities 404 and nested sub-commodities 405 that are 0 . . . n levels deep to provide granular sub-groupings. These nodes are only analyzed when CCM L2 selections are made at these particular levels within the commodity tree. The number of sub-commodities 404 and nested sub-commodities 405 may be user-defined. However, every constituent 406 is directly assigned to one and only one dependent node within a commodity tree. Other commodity trees can use the same constituents but not within the same tree. CCM L1 criteria is assigned at the commodity level and inherited to every node in the tree in order to ensure that all nodes have all uniform characteristics assigned.

Examples of uniform attributes 408 may include sampling criteria, period definition, history definition, and type of measure/analytic. Sampling criteria defines what data to sample such as product types, operations, steps, sources, etc. Period definition defines the unit of time to apply the specified analytic such as hour, day, week, or month. History definition defines the number of periods to be applied to the specified analytic. Type of measure/analytic defines the type of analytic to be applied such as standard Shewhart Control Charts (i.e., p-chart, np-chart, u-chart, or other similar charts.

Figure 5:
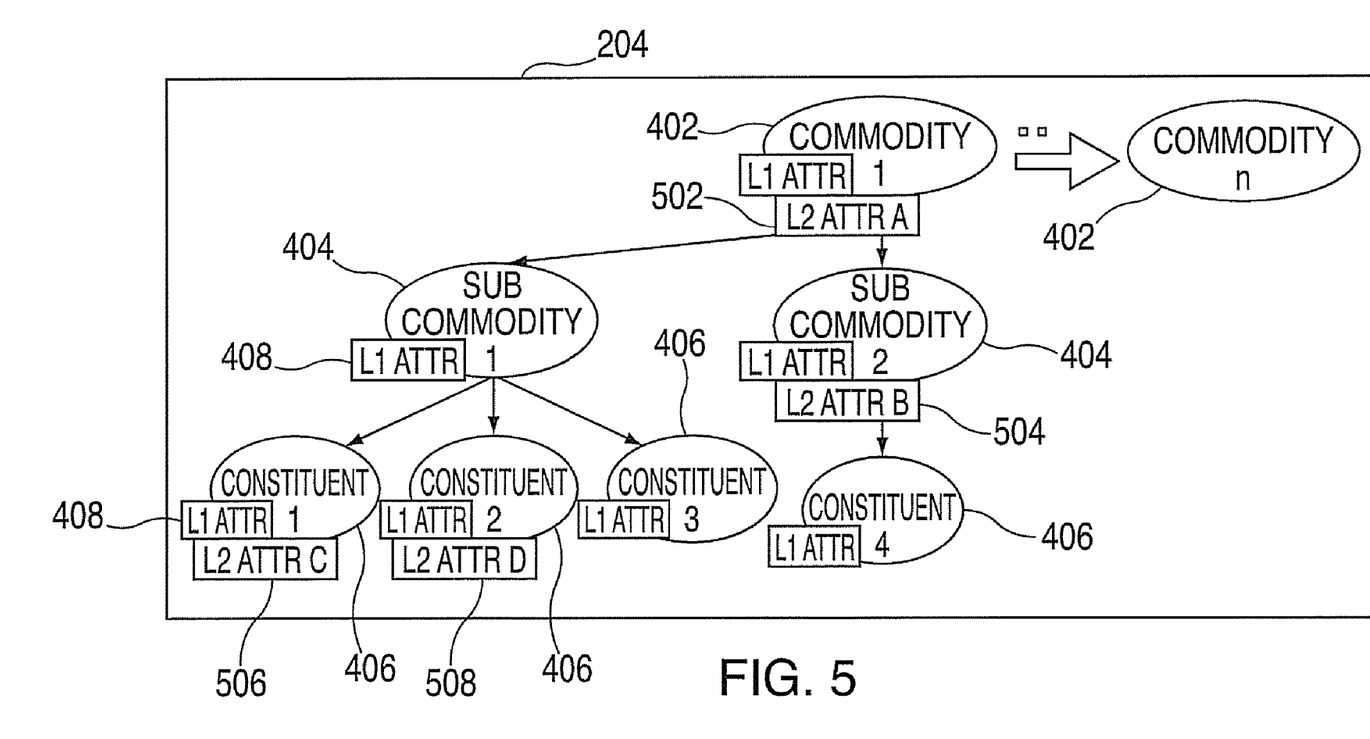
FIG. 5 is a diagram of a level 2 commodity constituent model that is associated with the CCM level 2 phase in an exemplary embodiment.

FIG. 5 illustrates a level 2 commodity constituent model 204. The modeling of the CCM L2 attributes establishes what dimensions are to be analyzed for each commodity. This process includes examining the entire commodity tree and selecting which nodes (e.g., level in the tree or model) and what patterns or trends at that level within the tree will be assigned dimensional attributes for analysis. The level 2 process updates tertiary trees created in the first part of the CCM process (Level 1) 202 with the dimensions and trends specified for each node within the tree as demonstrated in FIG. 5. CCM Level 2 is applied to the commodity tree by assigning "none", "any", or "all" nodes in the tree at each node level. These assignments are inherited down the tree to every dependent node in the tree that has a CCM L2. All leaf nodes (i.e., constituents) 406 inherit all CCM level 2 criteria regardless of whether the leaf node has a CCM level 2 assigned or not. Only nodes that result in a CCM level 2 assigned, either directly or inherited, will be analyzed.

Typical monitoring dimensions such as dimensions 502-508 used by the multi-dimensional commodity model 104 may include performance tolerances, noise filters, oscillation thresholds or trends, consecutive trending, negative performance threshold, and any other dimensions desired. Assignment of dimensions 502-508 to the commodity structure defines what will be analyzed (e.g., node) and establishes inheritance attributes. Performance tolerances define standard deviations from the mean. Noise filters define what is statistically significant sample size per period. Oscillation thresholds or trends define unwanted change oscillating around the mean within limits. Consecutive trending defines significant trending (negative or positive). Negative performance threshold defines absolute value limits regardless of sample size or trend.

Figure 6:
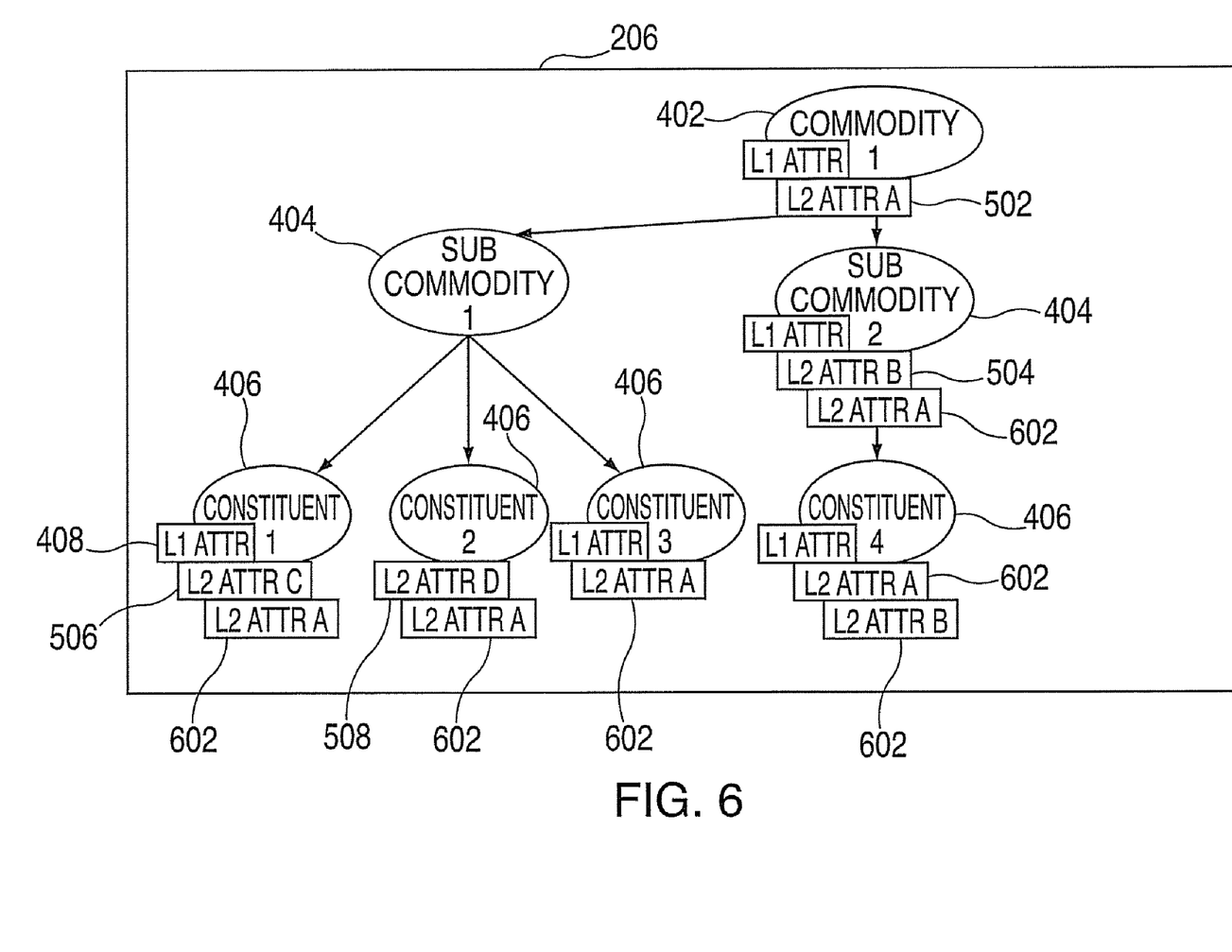
FIG. 6 is a diagram of a sample commodity tree created by the multi-dimensional commodity modeling component in an exemplary embodiment.

FIG. 6 illustrates a sample commodity tree 206 produced by the multi-dimensional commodity model and describes its dimensions and inheritance properties. The sample commodity tree 206 demonstrates how dimensions are assigned and inherited and result in analyzed dimensions of a commodity tree. In the commodity tree 206 of FIG. 6, the commodity constituent mapping is a simple tree consisting of two sub-commodities with three constituents categorized or related to sub-commodity 1 and one constituent related to sub-commodity 2. The quality engineer or other professional has assigned four specific dimensions to be analyzed directly. This includes all the attributes assigned by the level 2 attributes. The four dimensions 502-508 were assigned at different levels within the commodity tree as shown in FIG. 5. Dimension A 502 was assigned to the entire Commodity 1. Dimension B 504 was assigned to the entire sub-commodity 2, dimension C 506 was assigned for the specific constituent 1, and dimension D 508 was assigned for the specific constituent 2.

The inheritance policy of the commodity constituent model L2 results in the following:

Since dimension A 502 was assigned at the highest level—the commodity, every node in the tree that is either identified to be analyzed by another assignment of a dimension or every constituent under commodity 1 inherits dimension A 502 attributes. In this example, this means that since sub-commodity 1 is not specified as a dimension to be analyzed, it is slipped and no inheritance occurred. On the contrary, since sub-commodity 2 has been identified as an analyzed dimension (by assignment of dimension B 504), sub-commodity 2 also inherits dimension A 502 which implies sub-commodity 2 will be analyzed with dimension A 502 and B 504 attributes. The secondary effect of assigning dimensions at the commodity level is that all root nodes (i.e., constituents 1-4) are automatically assigned dimension A 502 to be analyzed. In this example, the assignment of dimension A 502 resulted in five inherited dimensions to sub-commodity 2 and constituents 1-4 406. Since dimension B 504 was assigned for sub-commodity 2, not only is sub-commodity 2 analyzed to this dimension, but also inherited to constituent 4. Thus constituent 4 now is assigned both dimension A 502 and B 504 to be analyzed. Dimension C 506 was assigned to constituent 1 and dimension D 508 was assigned to constituent 2 which are the lowest levels in the commodity model. All dimensions assigned at the constituent level are not inherited by any other nodes and results in a pure analysis assigned only to this constituent in this commodity tree. The net impact of the assignment of the four dimensions (A, B, C, and D) resulted in a total of 9 dimensions analyzed where six of the dimensions are a result of the inheritance policy.

Although all dimensions are assigned at different levels within the commodity tree, it is important to note that all dimensions are derived from the detailed constituents. Since the CCM L1 attributes established uniform characteristics across all nodes under the commodity, these analyses and analytics are derived from the bottom up from the nodes that inherited its properties as illustrated in FIG. 6.

The data modeling approach described above delivers multi-dimensional flexibility in quality data analysis without the need for extensive program hard-coding or rewrites. This invention is readily integrated into existing quality management systems. As a result, this invention becomes an enabler for dynamic queries of quality data in near real-time. As business operations and products change over time, this data modeling approach facilitates rapid changes in quality performance monitoring activities. The quality control and monitoring process enabled by this invention delivers the platform for time relevant quality data analysis, analysis of patterns and trends, predictive indicators, and uncovering the quality 'needle in the haystack'.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While preferred embodiments have been shown and described, various modifications and substitutions may be made thereto without departing from the spirit and scope of the invention. Accordingly, it is to be understood that the present invention has been described by way of illustration and not limitation.

The invention claimed is:

1. A quality management system for utilizing dynamic multi-dimensional commodity modeling, comprising:
a data collection component operable for collecting raw data;
a dynamic multi-dimensional commodity model component, comprising a plurality of dimensions and attributes, the dimensions and attributes are dynamically alterable via the dynamic multi-dimensional commodity model component;
a commodity tree generated by the dynamic multi-dimensional commodity model component;
a closed loop/corrective action component operable for resolving nonconformance issues resulting from analysis of the raw data and commodity tree; and
an analytic engine in communication with the data collection component, the multi-dimensional commodity model component, and the closed loop/corrective action component, the analytic engine performing;
receiving the raw data from the data collection component;
receiving the commodity tree;
performing analytics on the raw data according to rules defined by the commodity tree;
transmitting any nonconformance data resulting from performing the analytics to the closed loop/correction action component; and
resolving any identified nonconformances;
wherein generating the commodity tree comprises:
creating a commodity hierarchy data structure comprising:
at least one top level node; and
at least one leaf node dependent upon said at least one top level node;
a commodity constituent model created by assigning attributes to nodes in the hierarchy, the attributes sharing uniform characteristics and used in the analytics performed by the analytic engine; and
a second commodity constituent model created by selectively assigning at least one dimensional attribute to a node in the hierarchy that is used in the analytics performed by the analytic engine;
wherein dependent nodes inherit dimensional attributes assigned to corresponding upper level nodes; and
wherein the dimensional attributes are dynamically alterable during instantiation of the analytics engine via the dynamic multi-dimensional commodity model component.

* * * * *